United States Patent [19]

Gapinski et al.

[11] Patent Number: 5,762,095
[45] Date of Patent: Jun. 9, 1998

[54] COMBINATION PUMP HEAD

[75] Inventors: Albert G. Gapinski, Boulder, Colo.;
Charles M. Schwimmer, San Jose, Calif.

[73] Assignee: Schwinn Cycling & Fitness Inc., Boulder, Colo.

[21] Appl. No.: 635,861

[22] Filed: Apr. 22, 1996

[51] Int. Cl.$^6$ .................................................. F16K 15/20
[52] U.S. Cl. .................................................. 137/223; 137/231
[58] Field of Search ............................. 137/223, 231

[56] References Cited

U.S. PATENT DOCUMENTS

| 3,926,205 | 12/1975 | Gourlet | 137/231 |
| 5,379,796 | 1/1995 | Wang | 137/231 |
| 5,645,100 | 7/1997 | Chuang et al. | 137/223 |

Primary Examiner—Marguerite McMahon
Attorney, Agent, or Firm—Holland & Hart LLP

[57] ABSTRACT

A pump head comprising a main body defining a chamber and having a top end and a bottom end, a force transmitting member slidably positioned in the chamber adjacent to the top end of the main body, a resilient collar positioned in the chamber adjacent to the bottom end of the main body and in engagement with the force transmitting member, and a camming device pivotally mounted at the top end of the main body. The collar defines an axial cavity having an inner wall and an inside diameter. The camming device has first, second and third cam surfaces in selective engagement with the force transmitting member. The second and third cam surfaces act to displace the force-transmitting member into the chamber to different extents to compress the collar. Compression of the collar decreases the inner diameter of the collar, and thus causes the collar to sealingly engage the valve stem positioned in the axial cavity. Compression of the collar at differing levels allows the pump head to work with many valve stems of differing sizes.

13 Claims, 8 Drawing Sheets

COMBINATION PUMP HEAD

BACKGROUND OF THE INVENTION

1. Field of the Invention

This invention relates to a pump head for use in connection with pumps for inflating bicycle tires or other inflatable objects, and more particularly to a dual purpose pump head able to be used with both Schraeder and Presta valve stem types.

2. Description of the Prior Art

Virtually every bicycle tube has a valve stem which allows the tube to be inflated and deflated. The two most popular types of valve stems are the Schraeder valve stem and the Presta valve stem, both well known in the art. The Schraeder valve stem generally comprises a hollow cylinder including a depressible valve having an upper or sealed position and a lower or unsealed position. The valve is spring biased into the upper or sealed position to keep air from escaping from the inner tube through the valve. When an inner tube is filled through a Schraeder valve, the pump head is required to have a nipple which depresses the valve against the spring bias to allow air to flow past the valve and into the tube. When the pump head is removed, the spring bias, as well as the internal air pressure, move the valve to the upper or sealed position. The Schraeder valve is very popular on most styles of bicycle inner tubes.

The Presta valve stem is also a very popular valve for use on bicycle inner tubes. The Presta valve stem generally comprises a hollow cylinder (smaller in diameter than the Schraeder valve stem) having a valve at the top end thereof. The valve includes an externally threaded post movably positioned in the hollow cylinder and protruding away from an upper end thereof. An internally threaded nut mates with the external threads on the post, whereby advancement of the nut along the post causes the nut to engage the top of the cylinder, pulling a sealing head on the bottom of the post into a sealing relationship with a seat inside the cylinder. In this position, the post keeps air from leaking out of the inner tube through the valve. When the nut is backed-off or unscrewed along the length of the post, the post is free to slide downwardly into the cylinder until the nut again engages the top of the cylinder, in which position air is free to flow into or out of the inner tube. The post is not spring biased into the sealed position as in the Schraeder valve. When the nut is unscrewed, the air pressure inside the inner tube biases the valve to maintain the sealed position. The nut has notches formed in its sidewalls to allow air to flow through the nut past the post and into the valve, and ultimately into the inner tube.

Application of air pressure to inflate the tube overcomes the tube pressure, and forces the post down into the cylinder until the nut engages the top of the cylinder, allowing air to flow into the tube through the Presta valve stem.

Currently available pump heads for use in inflating inner tubes having either the Schraeder, Presta, or Italian style valve stems have required either an adapter, or the manipulation of the pump head mechanism to convert it to a suitable configuration for use with the different style valve stems. The prior art pump head version requiring an adapter utilizes the adapter to increase the smaller diameter Presta valve stem to a larger diameter to replicate the size of a Schraeder valve stem. The adapter is a separate piece that is releasably attachable to the upper end of the Presta valve, and can be easily lost or damaged, thus affecting the ability of the user to inflate an inner tube having a Presta valve stem.

Pump heads having convertible mechanisms generally have an inner mechanism which must be removed and reinserted in a different orientation to allow the conversion of the pump head for use with both Schraeder and Presta valve stems. During conversion, the mechanism can be lost or damaged, causing the pump head to be useless in inflating inner tubes having either the Schraeder or Presta valve stems. Such convertible pump heads are manufactured by A-PLUS Manufacturing of Taiwan, and are available under the brand names TREK or Blackburn, among others.

It is to overcome the shortcomings in the prior art that the present invention was developed.

SUMMARY

It is an object of the present invention to provide a pump head capable of sealingly engaging different sized valve stems without modification in a single chamber.

It is another object of the present invention to provide a pump head capable of sealingly receiving a Schraeder style valve stem for inflating an inner tube, and that can also sealingly receive a Presta style valve stem for inflating an inner tube.

The pump head of the present invention allows a user to engage valve stems of varying diameters for inflating inner tubes without having to modify either the valve stem or the pump head. The pump head has a single chamber which sealingly engages a relatively broad valve stem such as a Schraeder valve stem and actuates the spring loaded valve required to inflate the inner tube. The pump head also sealingly engages in the same chamber a relatively small diameter valve stem such as a Presta valve stem to inflate the inner tube. The pump head is designed to be applied to a floor pump or a frame pump, as well as other types of pumps.

Accordingly, the pump head of the present invention comprises a main body defining a chamber and having a top end and a bottom end, a force transmitting member slidably positioned in the chamber adjacent to the top end of the main body, a resilient deformable collar positioned in the chamber adjacent to the bottom end of the main body in engagement with the force transmitting member, and a camming device pivotally mounted at the top end of the main body. The collar defines an axial cavity having an inner wall.

The camming device has first, second and third cam surfaces in selective engagement with the force transmitting member. The second and third cam surfaces act to displace the force-transmitting member into the chamber to different extents to compress the collar. Compression of the collar deforms the collar radially inwardly to decrease the inner diameter of the collar thus causing the collar to sealingly engage the valve stem positioned in the axial cavity.

The inside diameter of the deformable collar is at a maximum dimension when the first cam surface engages the plunger, the inside diameter is at an intermediate dimension when the second cam surface engages the plunger, and the inside diameter is at a minimum dimension when the third cam surface engages the plunger. Accordingly, a larger diameter valve stem is sealingly engaged when the second cam surface is in contact with the plunger, and a smaller diameter valve stem is sealingly engaged when the third cam surface is in contact with the plunger.

Other aspects, features and details of the present invention can be more completely understood by reference to the following detail description of a preferred embodiment, taken in conjunction with the drawings, and from the appended claims.

DESCRIPTION OF THE PREFERRED EMBODIMENT

Figure 1:
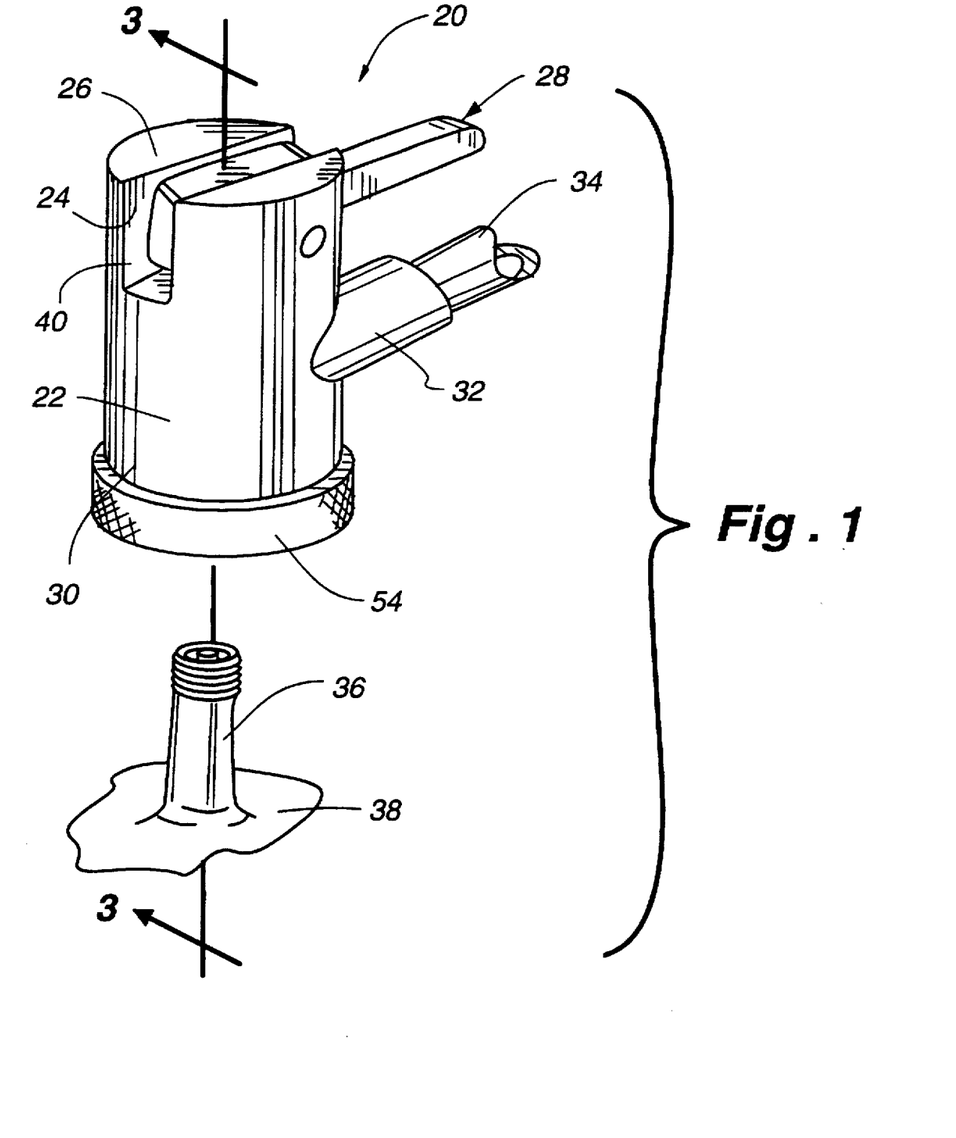
FIG. 1 is an isometric view of the pump head of the present invention positioned to receive a Schraeder valve stem prior to inflation of an inner tube.

Referring first to FIG. 1, a pump head 20 incorporating the present invention is illustrated and includes a generally cylindrical main body 22 defining a slot 24 through its top end 26 for receiving a camming device 28, an interior chamber 29 (not shown) extending from the base of the slot 24 to the open bottom end 30 of the main body 22, and lateral hollow arm 32 defining a port extending from and in fluid communication with the interior chamber of the main body 22. An air hose 34 of any normal design is attached to the lateral arm 32 for transmitting air under pressure to the chamber. A Schraeder valve 36, being mounted by any normal means to an inner tube 38 and in fluid communication therewith for use in inflating and deflating the inner tube, is also shown in FIG. 1, for receiving the pump head 20 to inflate the inner tube. The camming device 28 is pivotally attached between the flanges 40 formed by the slot 24 to be moved from an open, or first, far right position as shown, to a second, or vertical, position (FIG. 5), and to a third, or far left, position (see FIG. 8), depending on the type of valve to which the pump head 20 is applied.

Figure 2:
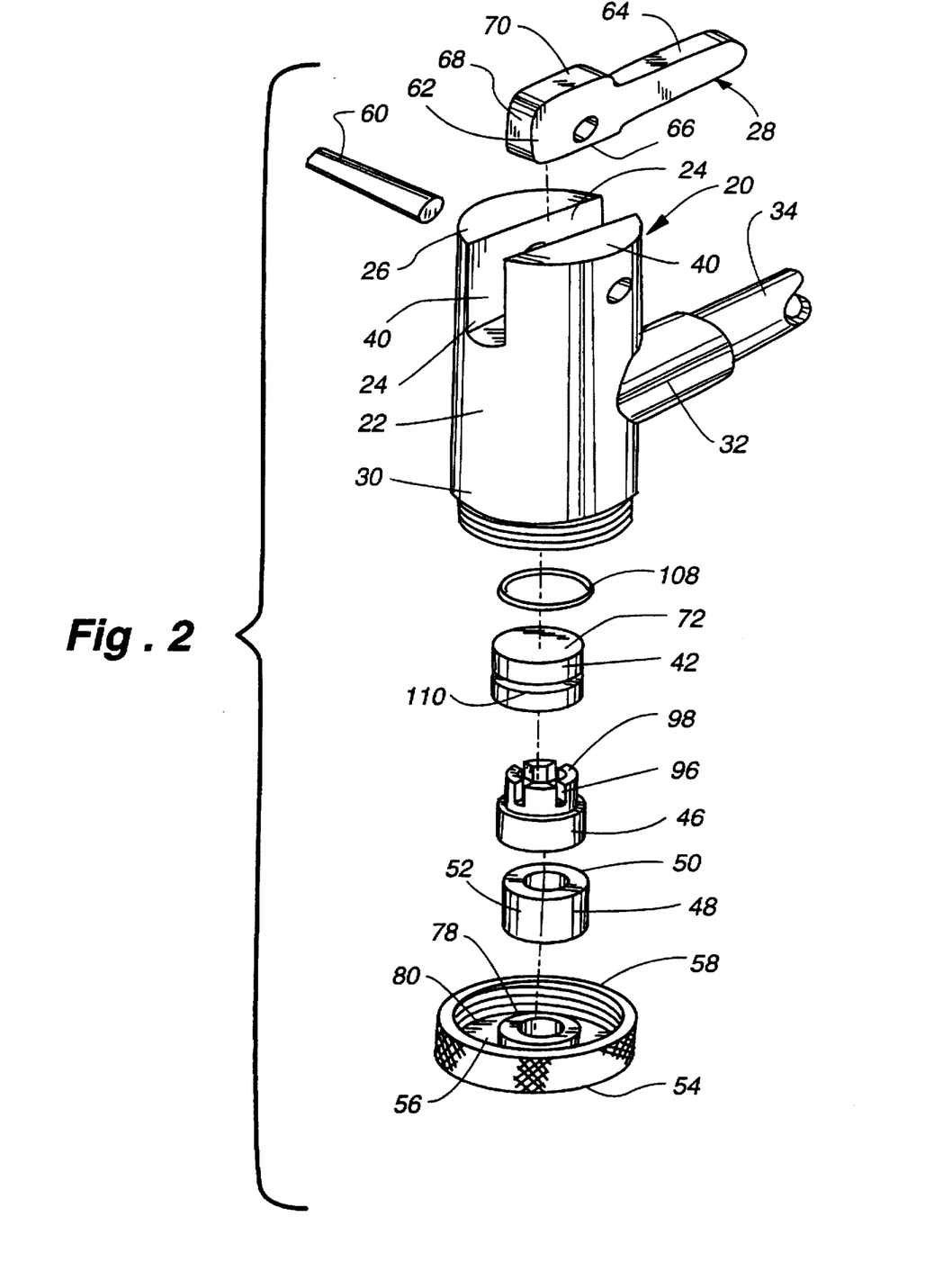
FIG. 2 is an exploded isometric view of the pump head shown in FIG. 1.

Referring next to FIG. 2, the components of the pump head 20 of the present invention are shown in exploded relationship. The chamber (See FIG. 3) of the main body 22 or housing contains a plunger 42 in sliding sealed engagement with the cylindrical wall 44 of the interior chamber 29. The plunger 42 rests upon a spacer 46, which in turn rests upon a cylindrical collar 48, or seal gasket, made of a resilient material having an internal surface 50 and an external surface 52. The internal surface of the collar 48 defines an inside diameter, and the external surface of the collar defines 48 an outside diameter. The plunger 42, spacer 46, and collar 48 are held in the main body by a base cap 54 having an end 56 defining an aperture 58 formed there through in communication with the interior chamber 29 of the main body 22. The base cap 54 is threadedly received on the bottom end 30 of the main body 22 to allow releasable attachment of the base cap 54 to the main body 22 for access to and replacement of the various parts contained within the main body 22.

The camming device 28 is pivotally mounted between the pair of flanges 40 defined on either side of the slot 24 by a pin 60 inserted through the flanges 40 with the camming device 28 positioned between the flanges 40. The camming device 28 generally includes a substantially square shaped cam head 62 and a handle 64, the cam head 62 defining first 66, second 68 and third 70 engagement surfaces which are in selective contact with a top surface 104 of the plunger 42 when in first, second, and third positions, respectively.

In general, actuation of the camming device 28 to the second and third positions allows the pump head 22 to grip and sealingly engage different sized valve stems, alleviating the need for extra parts or pump head modification. Actuation of the camming device 28 causes the plunger 42 to be pressed downwardly against the spacer 46, which in turn presses downwardly or axially against the collar 48. The collar 48 is restrained by the base cap 54 on the bottom and the interior walls 44 of the chamber 29 along its external surface 52, such that when it is axially compressed by the spacer 46 as a result of actuation of the camming device 28, the inner wall 44 of the collar 48 bulges inwardly and thus decreases the inside diameter of the collar. The further the collar 48 is compressed, the smaller the inside diameter of the collar 48 becomes.

When the camming device 28 is in the first or open position, the first engagement surface 66 is in contact with the top 72 surface of the plunger 42, but little or no force is placed on the collar 48 to alter the inner diameter of the collar. When the camming device 28 is moved to the second position, the second engagement surface 68 contacts the plunger 42 and the plunger is pressed or moved downwardly a first predetermined distance to compress the collar 48 a predetermined amount, and in turn reduce the inside diameter of the collar 48. When the camming device 28 is moved to its third position, the third engagement surface 70 is in contact with the top surface 104 of the plunger 42, displacing the plunger 42 even further downwardly, resulting in the collar 48 being compressed to a greater extent, and further reducing the inner diameter of the collar.

The changing inner diameter of the collar 48 allows the pump head 22 to sealingly engage valve stems of different outer diameters, such as the Schraeder and the Presta valve stems.

Figure 3:
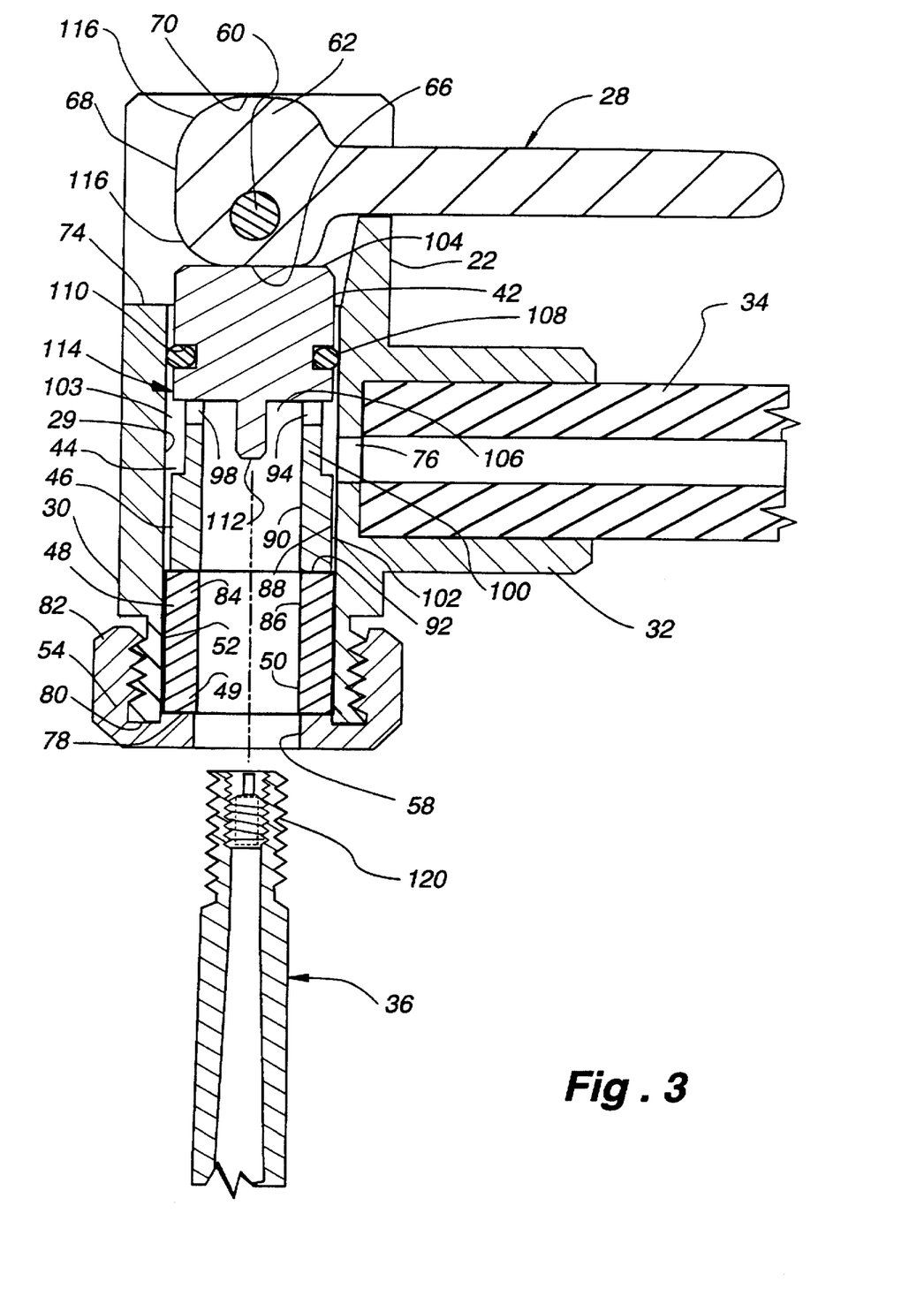
FIG. 3 is an enlarged fragmentary section taken along the lines 3—3 of FIG. 1.
Figure 6:
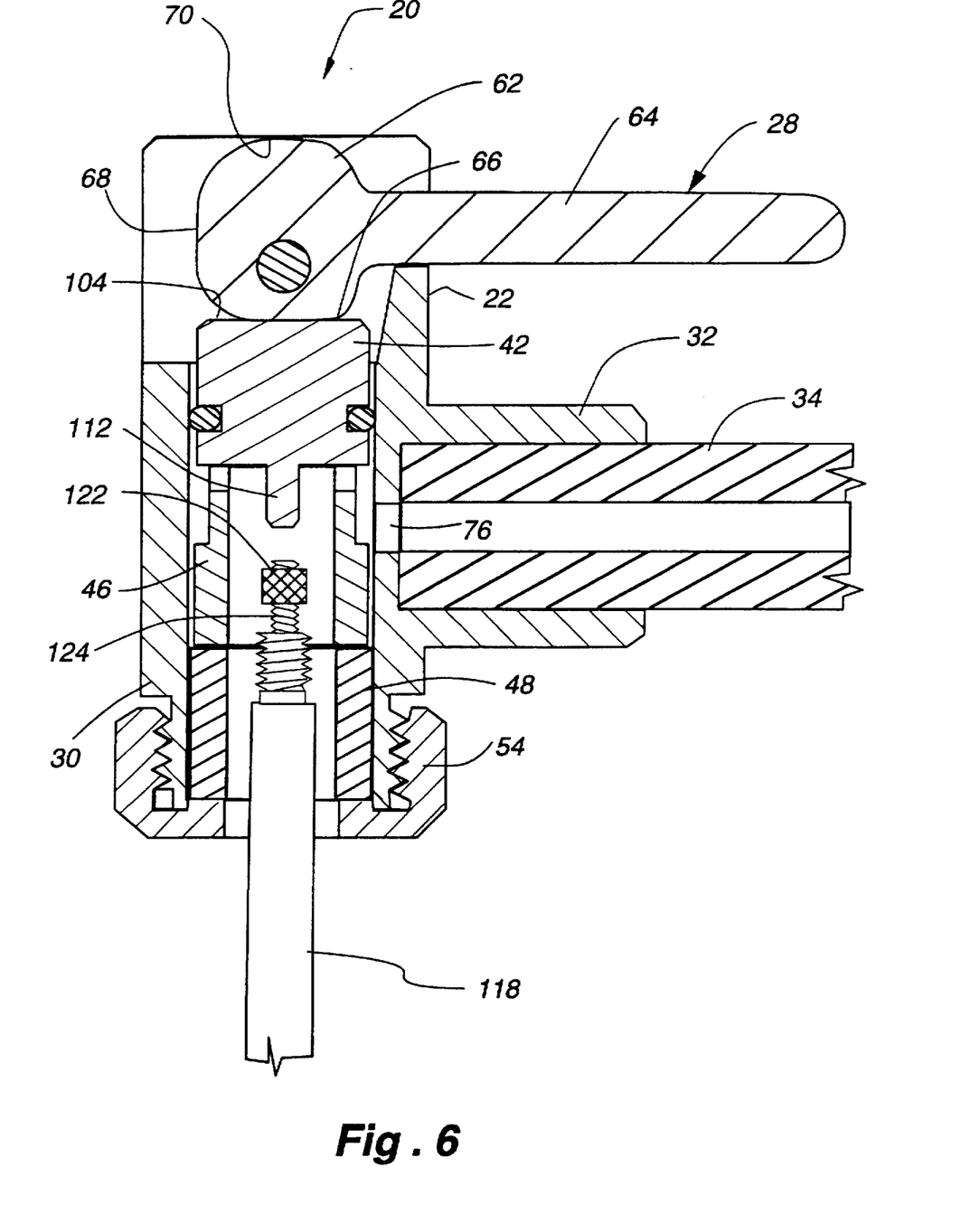
FIG. 6 is a section view similar to FIG. 4 illustrating the Presta valve inserted into the pump head.

The pump head 20 of the present invention is shown in the first or open position in FIGS. 3 and 6. The chamber 29 formed in the main body 22 is cylindrical in shape, and extends along the length of the main body from the bottom end 30 to the base 74 of the slot 24. The outer diameter of the bottom end 30 is threaded to receive the base cap 54. The port 76 is defined by the lateral arm 32 which extends radially from the main body to receive an end of the air hose 34 of a floor pump (not shown) or a pump body of a frame pump (not shown). The port 76 is in fluid communication with the internal chamber 29 of the main body 22.

The center bore of the collar and the center bore of the spacer together form a single chamber for receiving the desired valve stem.

The aperture 58 formed in the end 56 of the base cap 54 is centrally located to be positioned in alignment with the internal chamber 29 of the main body 22 when the base cap is threadedly received on the bottom end 30 of the main body 22, and is dimensioned to slidably receive Schraeder or Presta valve stems. The end surface 56 of the base cap 54 exposed to the internal chamber 29 when the base cap 54 is attached to the main body 22 forms a raised annular support surface 78 surrounding the aperture 58 formed therein for supporting the collar 48. When the base cap 54 is releasably attached to the main body 22, the raised annular support surface 78 fits into the cavity 29 in the main body. The end of the main body 22 engages the well 80 formed between the raised annular support surface 78 and the outer flange 82 of the base cap 54 to provide an indication that the base cap is received onto the main body to its fullest extent, and does not compress the collar 48. The main body 22 and the base cap 54 are formed of metal or high impact plastic, but could be formed of other materials having suitable strength.

The cap is for fine adjustment which may be required due to inaccuracies in the manufacturing or because of wear on the parts, but is not required for the invention to operate properly. If desired, the cap can cause a preload to be placed on the collar with the camming device is in the first position.

The collar 48 is made of a resilient material, such as Ethylene Propylene elastomer, or EPDM, which is compression moldable and has good weather resistance and sealing properties. The hardness characteristic of the rubber is preferably between approximately 40 shore A and 50 shore A on the ASTM standard, with a hardness of 42 A on the ASTM standard having been shown to be highly desirable. The collar 48 is cylindrical in shape defining a center bore, and having an outer wall 52 defining the outside diameter and the inner wall 50 defining the inside diameter. The outer diameter of the collar is substantially the same as the inside diameter of the chamber in the main body. Since the collar is made of a resilient material, axial compression of the collar 48 causes the height of the collar 48 to decrease, and the thickness of the wall 49 of the collar 48 to increase in a central location, which in turn decreases the inner diameter of the collar 48 (see FIG. 7).

Generally, the outside diameter of the collar is approximately 13.77 mm, the inside diameter (uncompressed) is approximately 8.25 mm, the wall 49 thickness is approximately 2.76 mm, and the height is approximately 12.95 mm.

The spacer 46 as mentioned previously is axially aligned with and rests against the top surface 84 of the collar 48 inside the chamber 29 of the main body 22. The spacer 46 is made of a hard plastic, such as ABS, and defines a generally cylindrical body 86 having an outside wall 88 and an inner wall 90, the inner wall defining a center bore having an inside diameter. The outside wall 88 of the spacer has an outside diameter which is substantially equal to the inside diameter of the chamber 29 of the main body 22. The spacer 46 is slidably disposed within the chamber 29 inside the main body 22. An annular base surface 92 of the spacer 46 is in continuous engagement with the top surface 84 of the collar 84. A series of notches 94 are formed in the upper end of the spacer 46 with the notches 94 oriented radially through the wall of the spacer 46. The notches 94 define circumferentially spaced fingers 96 at the top of the spacer 46 and each finger 96 has a top engagement surface 98. The top portion 100 of the spacer 46 has a slightly smaller outer diameter than the bottom portion 102, such that an annular gap 103 is formed between the top portion 100 of the spacer 46 and the wall 44 of the chamber 29 in the main body 22.

Generally, the outside diameter of the top portion 100 of the spacer 46 is approximately 11.77 mm, the outside diameter of the bottom portion 102 is approximately 13.77 mm, the inside diameter of the center bore is approximately 8.00 mm, and the height is approximately 12.1 mm.

The plunger 42 is slidably positioned inside the chamber 29 in the main body 22, and rests upon the top engagement surfaces 98 of the spacer 46. The plunger 42 is made of metal, high impact plastic, or other material having suitable strength. The plunger 42 is solid and cylindrical in shape, and defines a top cam engagement surface 104 and a bottom engagement surface 106 for contact with the top engagement surfaces 98 of the spacer. The plunger 42 has an outer diameter substantially the same as the inner diameter of the chamber 29 in the main body 22 and is maintained in a sealed sliding engagement with the inner wall 44 of the chamber 29 by an O-ring 108 positioned in an annular groove 110 formed continuously around the plunger 42. The O-ring 106 engages the wall 44 of the chamber 29 in the main body 22 to maintain a sealed engagement yet allows the plunger 42 to move axially along the chamber 29. The bottom engagement surface 106 of the plunger 42 defines a centrally located nipple 112 or pin extending downwardly therefrom. The plunger 42 in combination with the spacer 46 form a force-transmitting device 114.

Generally, the outside diameter of the plunger is approximately 13.77 mm, and the height is approximately 11.73 mm. The pin 112, or nipple, extends approximately 5.18 mm from the bottom surface 106 of the plunger 42.

The camming device 28 pivots about the pivot pin 60 at a location off center of the cam head 62. There are three active cam surfaces 66, 68 and 70, each corresponding to a different handle position. In any given position, one cam surface engages the top engagement surface of the plunger. In the open, or first, position, the handle 64 extends horizontally to the right, as viewed in FIGS. 3, 4 and 6. In the open or first position, the first cam surface 66 engages the top engagement surface 104 of the plunger 42. The first engagement surface 66 is aligned parallel to the extension of the handle 64, and is spaced from the center of the pivot pin 60 by approximately 5 mm.

Figure 5:
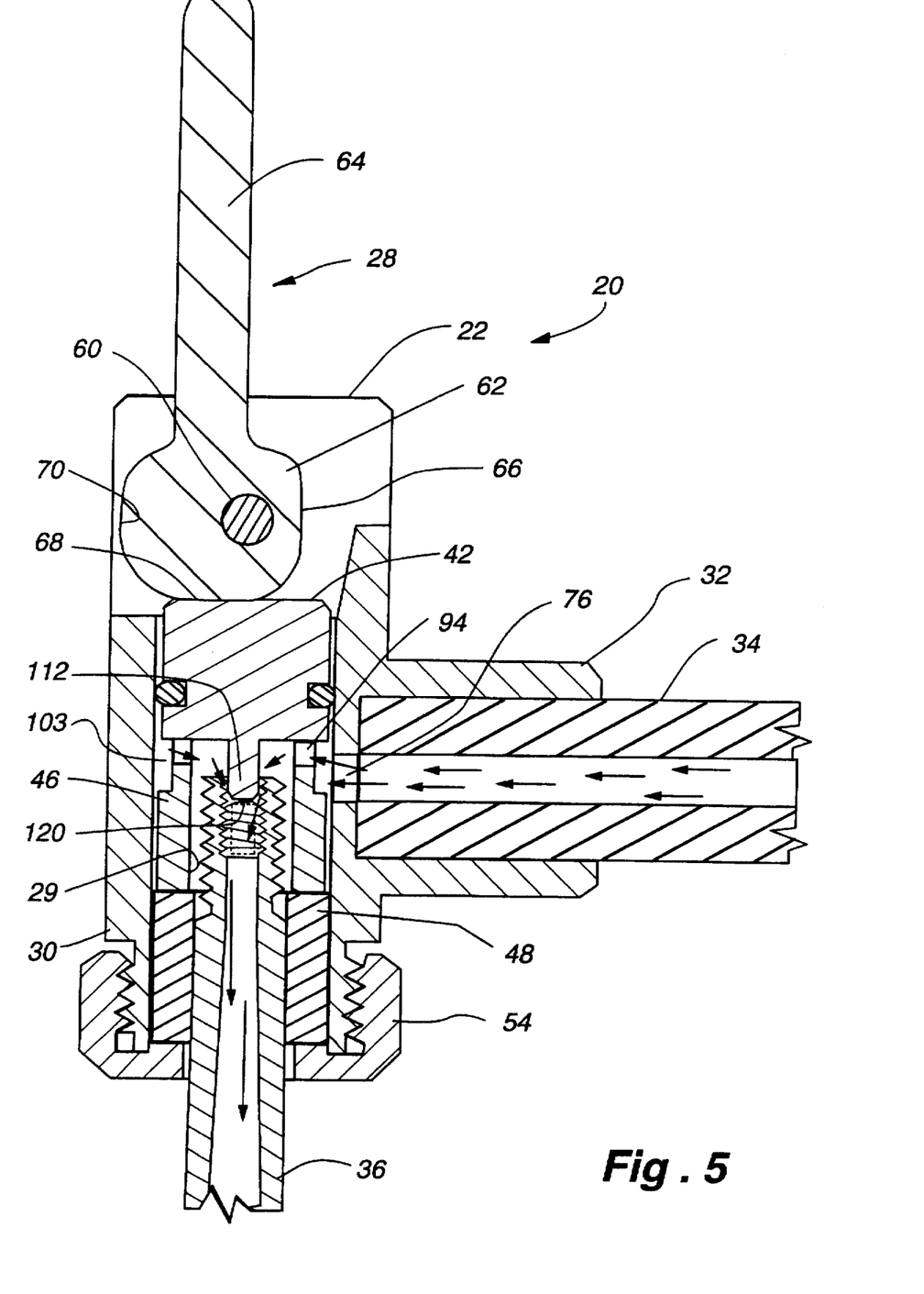
FIG. 5 is a section similar to FIG. 4, illustrating the camming device positioned in a second position to create an airtight seal about the Schraeder valve stem and depressing a valve.
Figure 7:
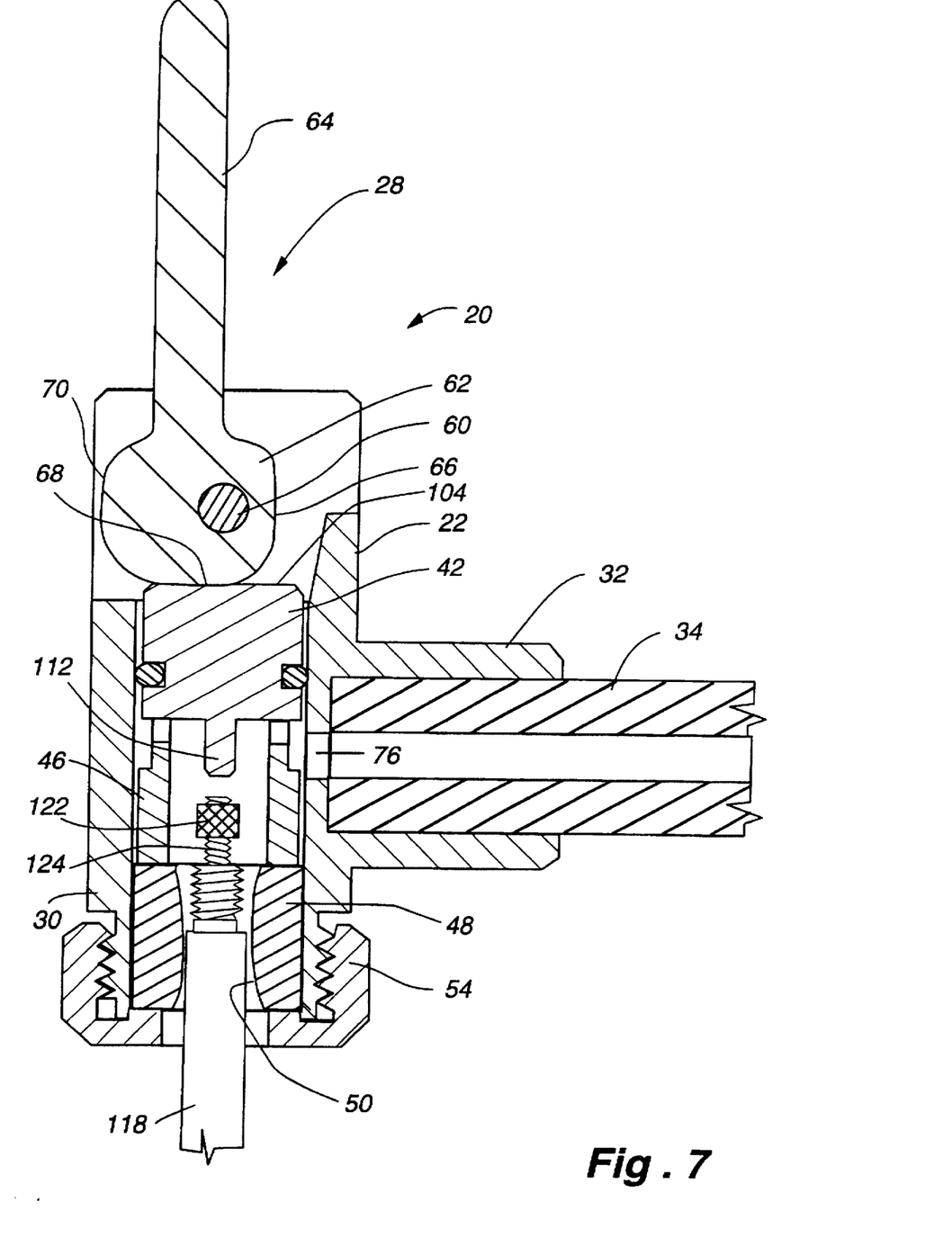
FIG. 7 is a section view similar to FIG. 6, illustrating the camming device in a second position.

In the second position, the second cam surface 68 is in engagement with the top engagement surface 104 of the plunger 42, and the handle 64 extends vertically with respect to the pump head 20, as shown in FIGS. 5 and 7. The second cam surface 68 is oriented perpendicularly to the extension of the handle 64. The second cam surface 68 is approximately 7 mm from the center of the pivot pin.

Figure 8:
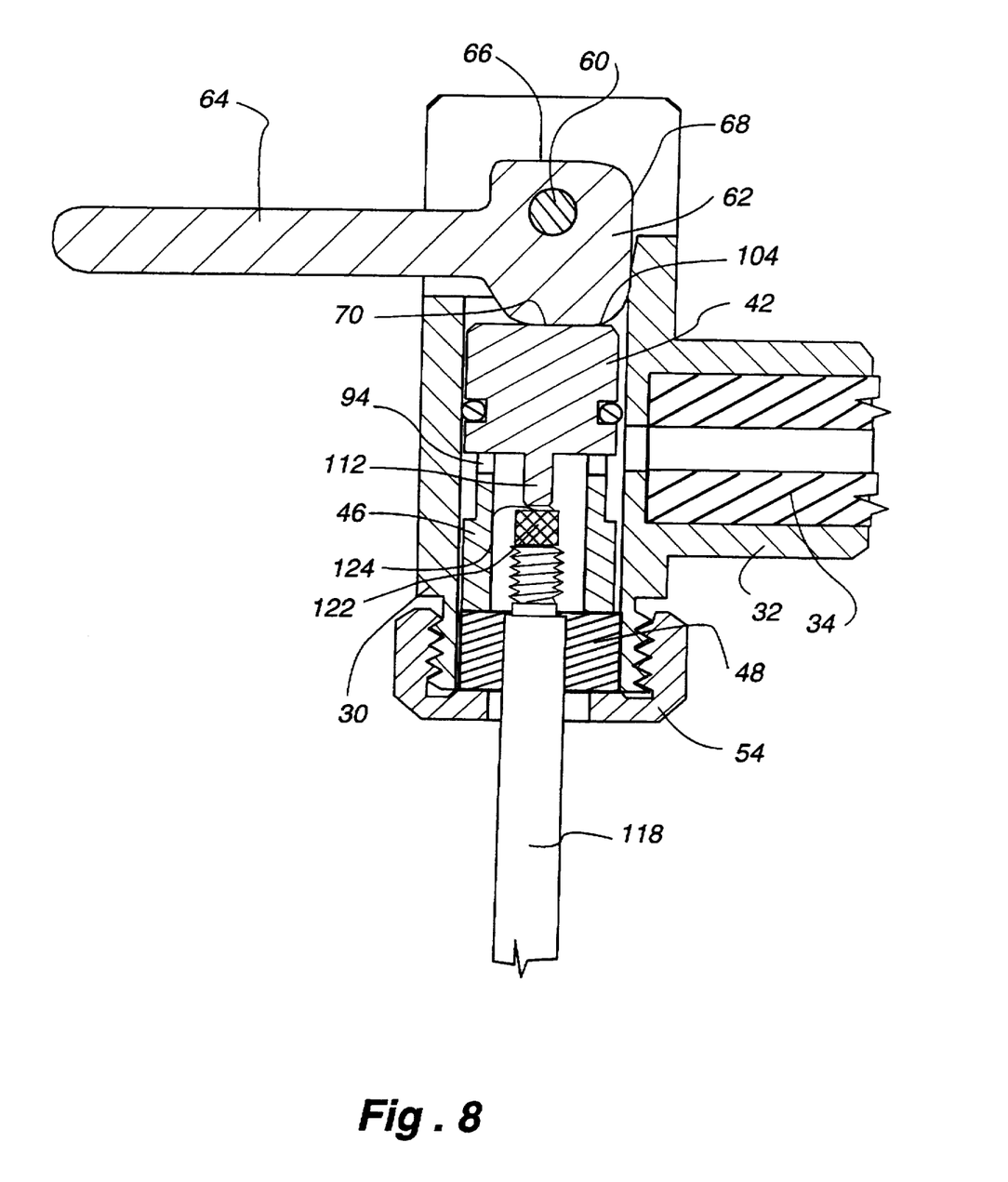
FIG. 8 is a section similar to FIG. 7, illustrating the camming device in the third position to create an air tight seal about the Presta valve stem.

In the third position, the third cam surface 70 is in engagement with the top engagement surface 104 of the plunger 42, with the handle 64 extending to the left of the pump head 20, as shown in FIG. 8. The third cam surface 70 is opposite the first cam surface 66, also extends parallel to the handle 64, and is approximately 9.3 mm from the center of the pivot pin 60. The cam head 62 has rounded corners 116 between the cam surfaces to allow the cam head 62 to be pivoted about the pivot pin 60 by use of the handle 64. Each of the distances mentioned above between the center of the pivot pin and the different cam surfaces is the minimum distance as measured along a line perpendicular to the cam surface that extends through the center of the pivot pin 60. Each cam surface is planar.

The pump head 20 of the present invention can be used on either a Schraeder style valve stem 36 or a Presta style valve stem 118 without the use of any conversion piece and without requiring the disassembly of the internal components of the pump head. The operation of the pump head 20 of the present invention with a Schraeder valve stem 36 is described below with reference to FIGS. 3 through 5, and with the Presta valve stem 118 in FIGS. 6 through 8.

Referring first to FIG. 3, the pump head 20 is shown positioned above a Schraeder valve 36. The camming device 28 is positioned in the open, or first position, where the first cam surface 66 is in engagement with the top engagement surface 104 of the plunger 42. In the first or open position, preferably no force is applied to the collar 48, so that the wall 49 of the collar 48 are not significantly bulged inwardly to reduce the dimension of the inside diameter of the collar 48. In the first or open position, the plunger 42 is in engagement with the spacer 46, the spacer is in engagement with the collar 48, and the collar is constrained between the spacer 46 and the base cap 54.

Figure 4:
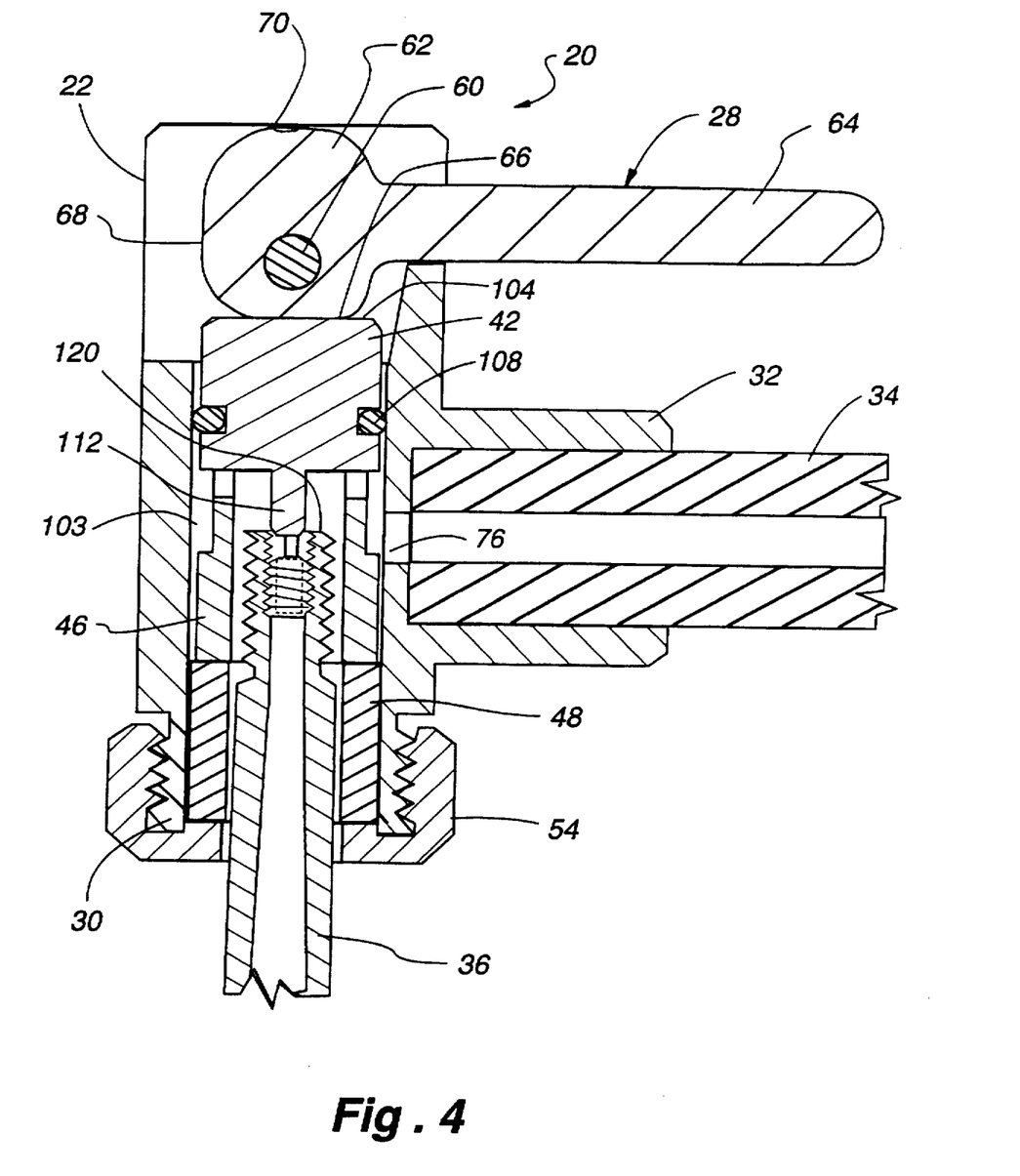
FIG. 4 is a section similar to FIG. 3, illustrating the Schraeder valve stem inserted into the pump head while the camming device is maintained in the open, or first, position.

Referring next to FIG. 4, the pump head 20 is shown positioned over the Schraeder valve stem 36, but prior to the movement of the camming device 28 to the second position. The pump head 20 is positioned on the Schraeder valve stem 36 preferably until the nipple 112 engages the valve 120 on the Schraeder valve stem 36 and depresses the spring-biased valve 120 to release the seal engagement of the valve. The Schraeder valve stem 36 in this position fits closely within the inner diameter of the collar 48. At this point, air can escape from the inner tube through the valve 120 and out through the bottom 30 of the main body 22 of the pump head 20.

Referring to FIG. 5, the camming device 28 is shown having been moved to the second position so that the second cam surface 68 is in engagement with the top engagement surface 104 of the plunger 42. Since the second camming surface is approximately 2 mm further away from the pivot pin 60 than the first cam engagement surface 66, the plunger 42 has been displaced into the chamber 29 in the main body 22 by approximately 2 mm. The downward movement of the plunger 42 causes the spacer 46 to move downwardly approximately 2 mm, acting to compress the collar 48 against the base cap 54. The inner wall 50 of the collar 48 then bulges radially inwardly reducing the inside diameter, and form an air tight seal around the outside of the Schraeder valve stem 36. Preferably, the collar 48 at least partially engages the Schraeder valve stem on the threaded upper portion to provide enhanced gripping strength.

The movement of the plunger 42 also causes the nipple 112 to push the valve 120 downwardly by approximately 2 mm, thus further opening the air passage way for inflation of the inner tube. The plunger 42 maintains a sealed engagement with the inner wall 44 of the chamber 29 in the main body 22, because of the O-ring 108, thus keeping any air from escaping through the top of the main body 22. The inner tube is inflated by pumping air through the air tube 34, through the aperture 76 formed in the pump head 20, into the annular gap 103 between the upper portion of the spacer 46 and the inner wall 44 of the chamber 29, through the notches 94 formed in the top of the spacer 46, down around the nipple 112 and through the Schraeder valve stem 36 and finally into the inner tube. This air flow path is shown by arrows in FIG. 5.

To remove the pump head from the Schraeder valve 36, the camming device 28 is moved from the second position to the first position, which thus allows the valve 120 to move back into sealed engagement under the spring bias mentioned above. The collar 48 also is unloaded, and the inside diameter increases to disengage the wall 50 from the valve stem 36. The pump head 20 is then simply pulled off of the Schraeder valve stem 36. It will be appreciated that the third position of the camming device 28 is not used with Schraeder valve stems 36.

In the event the Schraeder valve stem 36 is not inserted entirely into the pump head 20 to cause the engagement of the nipple 112 with the valve 120 to result in the release of air from the inner tube, the slight downward movement of the plunger 42 in moving the camming device 28 from the first to the second position may still be sufficient to displace the nipple 112 sufficiently to depress the valve 120 and release the air tight seal of the valve.

Use of the pump head 20 with a Presta valve stem 118 is shown in FIGS. 6 through 8. Referring to FIG. 6, the Presta valve stem 118 is shown with the pump head 20 positioned over the Presta valve stem 118 and the camming device 28 in its first or open position. The top nut 122 on the Presta valve has been unscrewed a small amount to allow the center post 124 to move axially into the Presta valve stem, as will be described further below. The Presta valve stem 118 fits easily within the collar 48 when the camming device 28 is in the first position. To form an airtight seal around the Presta valve stem 118 prior to inflation, the camming device 28 is moved from the first or open position, through the second position and into the third position. In the third position, the third cam surface 70 is in engagement with the top engagement surface 104 of the plunger 42. FIG. 7 shows the camming device 28 in the second position with the second cam surface 68 in contact with the top engagement surface 104 of the plunger 42, and shows the inner wall 50 of the collar 48 bulging under the compression force, but not a sufficient amount to create an airtight seal with the Presta valve stem 118.

Referring to FIG. 8, the camming device 28 has been moved to the third position where the third cam surface 70 is in contact with the top engagement surface 104 of the plunger 42, resulting in a net downward movement of the plunger 42 of approximately 4.3 mm from its position when in contact with the first cam surface 66. The nipple 112 or pin is not in contact with the top of the Presta valve stem 118 at this point, but a tight seal between the collar 48 and the valve stem 118 has been established. As the user begins to inflate the inner tube by pumping air through the hose 34 to the pump head 20, the differential pressure between the inner tube pressure and the pressure from the pump causes the post 124 of the Presta valve stem 118 to move axially downwardly into the Presta valve stem 118, thus disengaging the seal, and letting air flow into the inner tube through the Presta valve stem 118 to inflate the inner tube.

The air flow, shown by arrows in FIG. 8, moves from the pump (not shown) through the air hose 34, through the port 76, through the notches 94 formed on the top of the spacer 46, and into the Presta valve stem 118 similar to the air flow in the Schraeder valve stem 36 as described above, to inflate the inner tube.

In the event the Presta valve stem 118 is inserted to the point where the nipple 112 contacts the post 124 of the Presta valve stem 118 and slightly depresses it, air will escape from the inner tube and pass the collar 48 until the camming device 28 is moved to the third position. At that time the nipple 112 will have pressed the post 124 of the Presta valve stem 118 even further down to disengage the seal, and allow the air from the pump to pass through the Presta valve stem 118 and into the inner tube.

To remove the pump head 20 from the Presta valve stem 118, the camming device 28 is moved from the third position through the second position and into the first or open position to disengage the collar 48 and allow the internal wall 50 of the collar to reform into its original shape to break the sealing engagement of the collar 48 with the Presta valve stem 118. The post 124 is then biased upwardly by the inner tube air pressure into a sealing position to keep air from escaping through the Presta valve stem 118. The user then tightens the nut 122 on the post 124 until it is in engagement with the top of the Presta valve stem 118 to maintain an airtight seal.

As has been described above, the pump head 20 of the present invention can be used on valve stems having different diameters, such as the Schraeder 36 and Presta 118 valves used in the examples above, without any modification of the pump head 20 or the valve stem to facilitate use. The movement of the camming device 28 from the first to the second position causes the plunger 42 to be pushed downwardly a certain distance which has two effects. With the Schraeder valve, the first effect is that it compresses the collar 48 to form a seal around the Schraeder valve stem 36, and the second effect is that it depresses the valve 120 in the Schraeder valve stem 36 to allow air to flow through the Schraeder valve stem 36 and into the inner tube.

When used on a Presta valve stem 118, the movement of the camming device 28 from the first or open position to the third position displaces the plunger 42 downwardly even further than when the camming device 28 is in the second position, to cause the collar 48 to bulge an even greater amount to decrease the inside diameter of the collar 48 to form an airtight seal around the relatively smaller diameter Presta valve stem 118. The nipple 112 or pin has no necessary function in use with the Presta valve, although if the nipple does engage the center post 124 of the Presta valve, it only facilitates opening the seal to allow air into the Presta valve and thus into the inner tube.

The seal on the various valve stems formed by the compression of the collar 48 also generates a substantial gripping force on the valve stem to keep the pump head 20 from disengaging from the valve stem during use. The key elements of the utility of the pump head 20 of the present invention include the amount of any pre-compression loading of the compressible collar, the length (height) of the compressible collar, the Durometer values associated with the material used in the compressible collar 48, the inside diameter of the collar 48, and the wall 50 thickness of the compressible collar 48.

The pump head 20 of the present invention is able to be used, but is not limited to use on, both floor pumps and frame pumps.

Although the present invention has been described with a certain degree of particularity, it is understood that the present disclosure has been made by way of example, and changes in detail or structure may be made without departing from the spirit of the invention, as defined in the appended claims.

We claim:

1. A pump head comprising:
   a main body defining a chamber and having a top end and a bottom end;
   a force transmitting member slidably positioned in said chamber adjacent said top end of said main body;
   a camming device pivotally mounted at said top end of said main body, said camming device having first, second and third cam surfaces in selective engagement with said force transmitting member;
   a resilient collar stationarily positioned in said chamber between said bottom end and said force-transmitting member, and defining an axial cavity having an inner wall and an inside diameter; and
   wherein said inside diameter is at a maximum dimension when said first cam surface engages said plunger, said inside diameter is at an intermediate dimension when said second cam surface engages said plunger, and said inside diameter is at a minimum dimension when said third cam surface engages said plunger
   wherein said camming device comprises a cam head having a substantially square shape defining four sides, where three adjacent sides define said first, second and third cam surfaces, respectively, and a handle is attached to and extends from said fourth side; and
   a pin pivotally connects said camming device to said main body, said pin positioned closest to said first cam surface, and farthest from said third cam surface.

2. A pump head as defined in claim 1, wherein said force-transmitting member further comprises:
   a plunger having a top engagement surface for selective contact with said first, second or third cam surfaces, and a bottom surface;
   a spacer defining a center bore and having a top end defining an engagement surface and a bottom end, said top engagement surface being in engagement with said bottom surface of said plunger, and said bottom end in engagement with said collar.

3. A pump head as defined in claim 1 wherein said pump head is alternatively engageable with a first valve stem and a second valve stem, the first valve stem having a larger diameter than the second valve stem, and wherein:
   said inside wall forms an airtight seal around the first valve stem when the first valve stem is positioned in said chamber in said main body and said second cam surface engages said force-transmitting device; and
   said inside wall forms an airtight seal around the second valve stem when the second valve stem is positioned in said chamber in said main body and said third cam surface engages said force-transmitting device.

4. A pump head as defined in claim 3 wherein the first valve stem has a valve in sealed engagement at a top end, and wherein:
   said force transmitting device has a downwardly extending pin, said pin actuating the valve in the first valve stem to unseal the sealed engagement when said second cam surface engages said force-transmitting device.

5. A pump head for alternate use with a first valve stem having a cylindrical body and a second valve stem having a cylindrical body, the first valve stem having an outer diameter greater than the outer diameter of the second valve stem, and a valve biased in a sealing position, said pump head comprising:
   a main body defining a chamber therethrough and having a top end and a bottom end;
   a resilient collar positioned in said chamber adjacent the bottom end of said main body;
   a force-transmitting means positioned in said chamber in engagement with said collar and adjacent to said top end;
   a means for selectively displacing said force-transmitting means to compress said collar, said force-transmitting means having a first position to axially compress said collar a small amount, a second position to axially compress said collar an intermediate amount to sealingly engage said first valve stem and depress said valve and disengage it from said sealing position, and a third position to axially compress said collar a large amount and sealingly engage said second valve stem.

6. A pump head as defined in claim 5, further comprising a base cap releasably attached to said bottom end of said main body, said base cap having an end defining an aperture positioned in communication with said chamber, and having an annular raised portion formed continuously around said aperture to support said collar.

7. A pump head as defined in claim 6, wherein said collar is uncompressed when said base cap is attached thereto, and said displacing means is in said first position.

8. A pump head as defined in claim 6 wherein:
   said base cap has an interiorly threaded rim, and defines an annular well between said rim and said raised portion;

said bottom end of said main body defines a bottom rim and has external threads formed adjacent to said bottom rim; and said base cap is threadedly received on said bottom end of said main body, with said annular raised portion projecting into said chamber and said bottom rim of said main body seated in said annular well.

9. A pump head as defined in claim 5, wherein said resilient collar has a Durometer value in the range of 40 A and 50 A.

10. A pump head for alternate use with a large diameter valve stem having a valve biased in a sealing position and a small diameter valve stem, said pump head comprising:

a main body having a chamber, a top end and a bottom end, and an air inlet port communicating with said chamber;

a plunger slidably positioned in said chamber adjacent said top end of said main body having a top end with an engagement surface and a bottom surface, a nipple extending from said bottom surface and centrally positioned thereon;

a spacer slidably positioned in said chamber and defining a center bore and having a top end with a plurality of circumferentially spaced fingers defining a plurality of notches therebetween, said fingers each having defining a top engagement surface, a bottom end, each of said top engagement surfaces being in engagement with said bottom surface of said plunger;

a camming device pivotally mounted at said top end of said main body, said camming device having a first, second and third cam surfaces in selective engagement with said top engagement surface of said plunger;

a resilient collar stationarily positioned in said chamber adjacent said bottom end and defining an axial center bore, said collar having an inner wall and an inner diameter, said collar engaging said bottom end of said spacer; and wherein when said large diameter valve stem is positioned in said axial cavity and said second cam surface engages said top engagement surface of said plunger, said nipple engages the biased valve to release said sealing engagement and said inner wall of said collar engages said larger diameter valve stem to form an airtight seal, and when said smaller diameter valve stem is positioned in said axial cavity and said third cam surface engages said top engagement surface of said plunger, said inner wall of said collar engages said smaller diameter valve stem to form an airtight seal.

11. A pump head as defined in claim 10, wherein said pump head is operably attached to a frame pump.

12. A pump head as defined in claim 11, wherein said pump head is operably attached to a floor pump.

13. A pump head as defined in claim 10, wherein said center bore of said collar and said center bore of said spacer defines a single chamber for receiving alternatively either a large diameter or a small diameter valve stem.

* * * * *